(12) United States Patent
Krishnan et al.

(10) Patent No.: US 11,816,040 B2
(45) Date of Patent: Nov. 14, 2023

(54) DEVICE MEMORY PROTECTION FOR SUPPORTING TRUST DOMAINS

(71) Applicant: Intel Corporation, Santa Clara, CA (US)

(72) Inventors: Vidhya Krishnan, Folsom, CA (US); Siddhartha Chhabra, Portland, OR (US); David Puffer, Tempe, AZ (US); Ankur Shah, Folsom, CA (US); Daniel Nemiroff, El Dorado Hills, CA (US); Utkarsh Y. Kakaiya, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/712,109

(22) Filed: Apr. 2, 2022

(65) Prior Publication Data

US 2022/0222185 A1 Jul. 14, 2022

(51) Int. Cl.
*G06F 12/00* (2006.01)
*G06F 12/14* (2006.01)
(Continued)

(52) U.S. Cl.
CPC ...... *G06F 12/1433* (2013.01); *G06F 11/1004* (2013.01); *G06F 12/0292* (2013.01);
(Continued)

(58) Field of Classification Search
CPC ............. G06F 12/1433; G06F 11/1004; G06F 12/0292; G06F 12/1408; G06F 12/1466; G06F 12/1483; G06F 2212/1032; G06F 2212/1052; G06F 12/109; G06F 12/145; G06F 2212/151; G06F 2212/651; G06F 2212/657; G06F 12/1441; G06F 21/53; G06F 21/78

See application file for complete search history.

(56) References Cited

U.S. PATENT DOCUMENTS

| | | | |
|---|---|---|---|
| 2017/0185766 A1* | 6/2017 | Narendra Trivedi | ...................... G06F 21/606 |
| 2019/0042463 A1* | 2/2019 | Shanbhogue | ....... G06F 9/30145 |
| 2020/0134208 A1* | 4/2020 | Pappachan | ......... G06F 12/1441 |

OTHER PUBLICATIONS

Intel, "Intel® Iris® Xe MAX Graphics Open Source Programmer's Reference Manual For the 2020 Discrete GPU formerly named "DG1"", vol. 13: General Assets, Feb. 2021, Revision 1.0, 100 pages.

(Continued)

*Primary Examiner* — Arvind Talukdar
(74) *Attorney, Agent, or Firm* — JAFFERY WATSON MENDONSA & HAMILTON LLP

(57) ABSTRACT

Device memory protection for supporting trust domains is described. An example of a computer-readable storage medium includes instructions for allocating device memory for one or more trust domains (TDs) in a system including one or more processors and a graphics processing unit (GPU); allocating a trusted key ID for a TD of the one or more TDs; creating LMTT (Local Memory Translation Table) mapping for address translation tables, the address translation tables being stored in a device memory of the GPU; transitioning the TD to a secure state; and receiving and processing a memory access request associated with the TD, processing the memory access request including accessing a secure version of the address translation tables.

21 Claims, 9 Drawing Sheets

(51) Int. Cl.
*G06F 11/10* (2006.01)
*G06F 12/02* (2006.01)
(52) U.S. Cl.
CPC ...... *G06F 12/1408* (2013.01); *G06F 12/1466* (2013.01); *G06F 12/1483* (2013.01)

(56) References Cited

OTHER PUBLICATIONS

Extended European Search Report in EP Application No. 23155456.9, dated Aug. 8, 2023, 9 pages.

\* cited by examiner

Creation of Encrypted and
Integrity Protected Version
of Translation Table

DEVICE MEMORY PROTECTION FOR SUPPORTING TRUST DOMAINS

FIELD

This disclosure relates generally to the field of electronic devices and, more particularly, to device memory protection for supporting trust domains.

BACKGROUND

GPU (Graphics Processing Unit) compute workloads are becoming more important across multiple business domains to accelerate processing intensive workloads. There is also a strong incentive to move these workloads to the cloud for optimizing the overall cost of processing.

However, guaranteeing confidentiality and integrity for GPU workloads is also becoming more critical as compute workloads in the server space gain importance. While confidentiality and integrity during the period that data is being operated on by the GPU is critical, it is similarly important that the GPU performance is not unnecessarily compromised to achieve this end goal.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to device memory protection for supporting trust domains.

In improving processing operation, compute workloads may be transferred to a processing accelerator, such as a graphics processing unit (GPU), to accelerate operations. However, such processing by an accelerator requires proper handling of security concerns, which may be complicated by the implementation of trust domains that can modify the privilege levels for certain elements. As used herein, "trust domain" (TD) refers to a hardware-isolated, virtual machine (VM), and "accelerator" refers to an apparatus to accelerate processing operation by one or more processors. An accelerator may include, for example, a GPU (Graphics Processing Unit) or other similar apparatus.

A VMM (Virtual Machine Manager, which operates as a hypervisor for virtual machine management) and PF KMD (Physical Function Kernel Mode Driver) have traditionally operated at a higher privilege for a GPU. These are responsible for providing isolation between virtual machines or processes using page tables.

To support the required security posture for moving compute loads to the cloud, it is important to provide protections against elements the VMM or PF KMD can control, while still allowing for needed functionality to keep the GPU operational for processing of use cases.

In some embodiments, an apparatus, system, or process is implemented to provide confidentiality and integrity of device memory. Techniques are provided to protect GPU local memory page tables in addition to adding confidentiality and integrity support to all of device memory, while avoiding added performance overhead. An embodiment may be applied to any accelerator with attached memory that is utilized in implementing a requirement for memory protection.

In a virtualized GPU that supports SR-IOV (Single-Root Input-Output Virtualization), GPU memory resources are managed by system software on the host. Depending on whether memory is system memory (on the host side) or device memory (on the accelerator side), the VMM, host operating system (OS), or PF KMD are responsible for managing the physical address translations tables. However, these entities are not trusted in a trust domain. For example, in TDX I/O operation, the VMM, host OS, and PF KMD are not generally trusted by the trust domain.

In some embodiments, an apparatus, system, or process enables use of GPU memory resources of a TD in a trusted manner, while preserving the role of processing resources, including the VMM, host OS, and PF KMD, as the manager of those resources. In some embodiments, device memory protection is provided for the trust domains from any other entity including the VMM, and further protects the device memory from physical attacks.

Figure 1A:
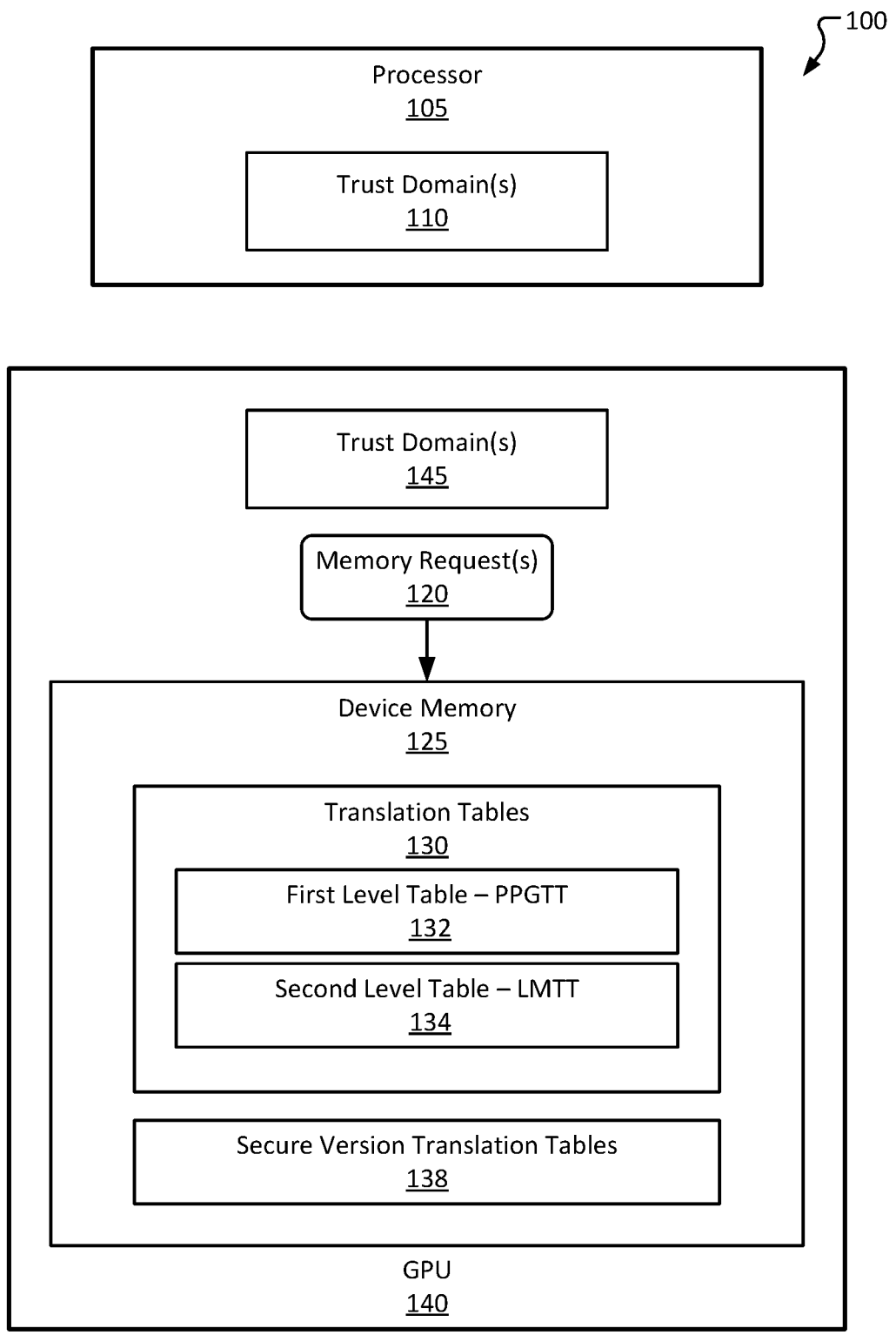
FIGS. 1A and 1B illustrate memory tables and memory confidentiality for supporting trust domains, according to some embodiments.
Figure 1B:
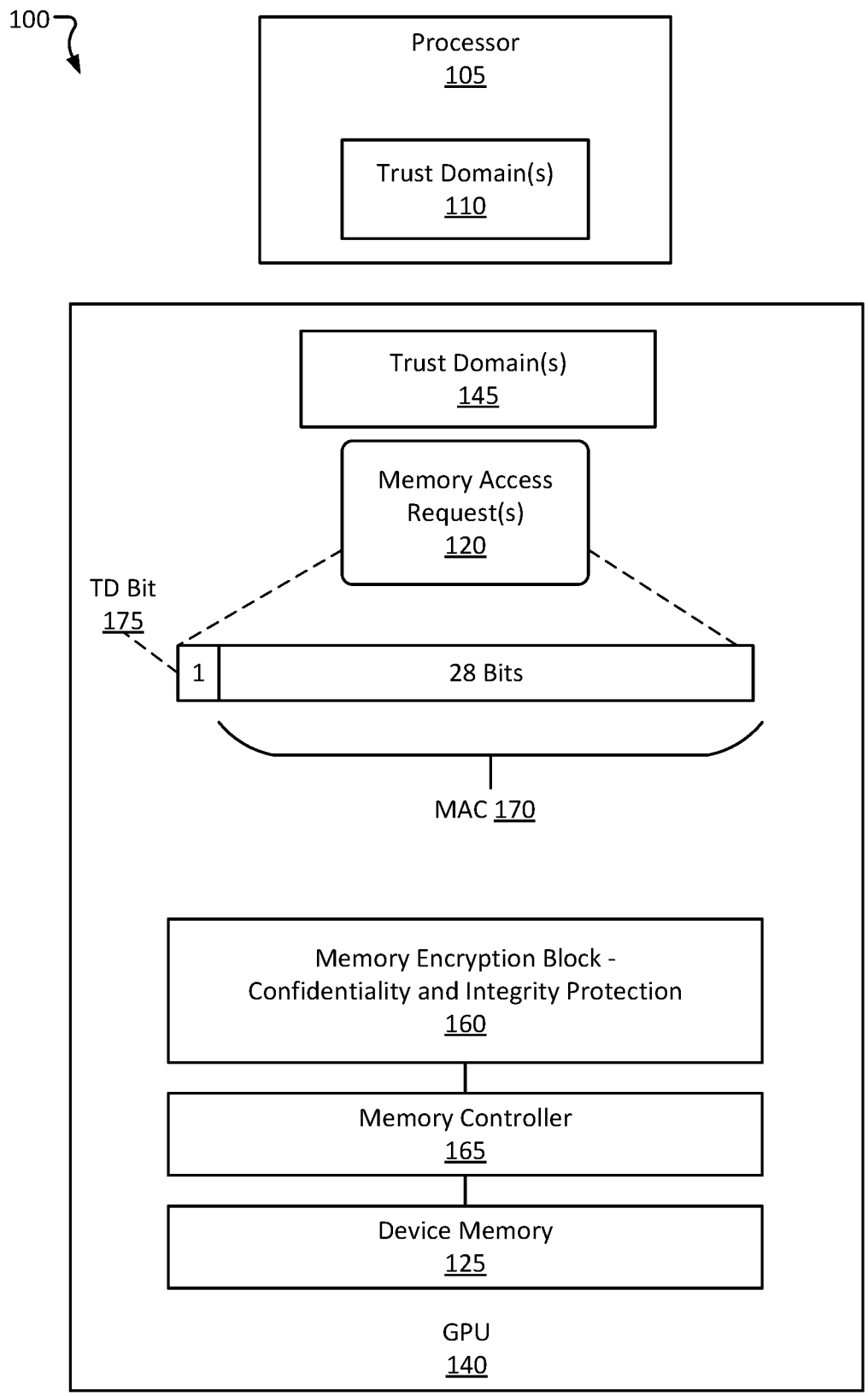

FIGS. 1A and 1B illustrate memory tables and memory confidentiality for supporting trust domains, according to some embodiments. In some embodiments, to assist in providing confidentiality and integrity requirements for support of trust domains, the following key concepts are implemented:

(1) Protected page tables and key ID assignment to guests—Memory requests in a system are to go through a first level table that is a per process table and then a second level table that is used to obtain a final physical address. In general, address translation tables (which may be referred to generally as translation tables herein) include Graphics Translation Tables GTT (Graphics Translation Table, or global GTT), LMTT (Local Memory Translation Table), and PPGTT (Per-Process Graphics Translation Table), which are memory-resident page tables containing an array of page translation entries used in mapping memory addresses to physical memory addresses. In some embodiments, a secure version of translation tables is generated and stored, with encryption keys for access to the translation tables being generated and key IDs associated with the encryption keys being allocated to guests of the system.

(2) Memory confidentiality and integrity—A memory encryption block that supports both confidentiality and integrity is added ahead of the memory controller for device memory.

As illustrated in FIG. 1A, a system or apparatus 100 includes translation tables 130 including a table structure with multiple levels. As used herein, translation tables refers in general to tables that are used to translate a virtual address to device physical address. In some embodiments, memory requests 120 to a device memory 125 originating from a GPU 140 utilize translation tables 130 to translate virtual addresses to device physical addresses, the translation tables 130 including a first level table 132, the first level table being a per process PPGTT table, and a second level table 134, the second level table being an LMTT table providing final device physical addresses. In some embodiments, the memory requests pass through the first level table 132 to the second level table, which is used to obtain the final device physical address.

The second level table 134 resides in the device memory 125 and may be used for local memory in place of, for example, the Intel VT-d (Intel Virtualization Technology for Directed I/O) translation tables used for system memory managed by system software (i.e., by the host OS (Operating System) and VMM (Virtual Memory Manager)). The translation tables 130 are managed by the Host KMD, in coordination with the VMM or host OS. In some embodiments, a separate table structure is allocated for each trust domain or assignable interface that receives local memory resources.

In some embodiments, to support confidentiality and integrity requirements, a secure version of the translation tables 138 is generated. An associated GPU 140, which may include one or more trust domains 145, can run multiple contexts at a given point of time on the different engines and each of these could be running on behalf of different virtual functions (VFs), wherein some of the VFs may be trust domains 145 and others may be non-trusted VMs. In some embodiments, the GPU hardware is to use the secure version of the second level table for trust domain accesses and the non-secure version for the requests from the non-trusted VMs.

As illustrated in FIG. 1B, a system or apparatus 100 includes the GPU 140, with a memory encryption block 160 that supports both confidentiality and integrity being added ahead of a memory controller 165 for device memory 125. In some embodiments, the memory encryption block 160 is not only used to provide protection from physical attacks, but further is used to provide the isolation between the different VFs (Virtual Functions) and also to detect any type of integrity attacks on the trust domain data. Separate keys for encryption may be provided for each trust domain to ensure that an integrity failure will occur when one trust domain attempts to read or write data belonging to another TD.

As shown in FIG. 1B, memory requests 120 may include a certain number of integrity bits. In some embodiments, in addition to bits for a MAC value 170, a TD bit 175 in a memory request 120 is further provided to ensure that encrypted data belonging to a TD is not returned back to a non-TD entity, thus providing protection against, for example, translation table re-mapping attacks by the PF KMD or VMM. To ensure that latency is optimized, the integrity may be implemented using a hash function on CRC (Cyclic Redundancy Check) bits of the memory controller 165. The current proposal uses 28 bits for the MAC (Message Authentication Code) 170 along with an extra bit to indicate the CL (Cache Line) belongs to a TD. The 29 bits are stored in the CRC bits available for the memory request transactions. This technology may be applied to ensure there is no added performance impact from additional integrity related information added to the solution as existing bits can be utilized in the integrity protection. In some embodiments, the hash computation for integrity support is performed post encryption by the memory and encryption block.

Figure 2A:
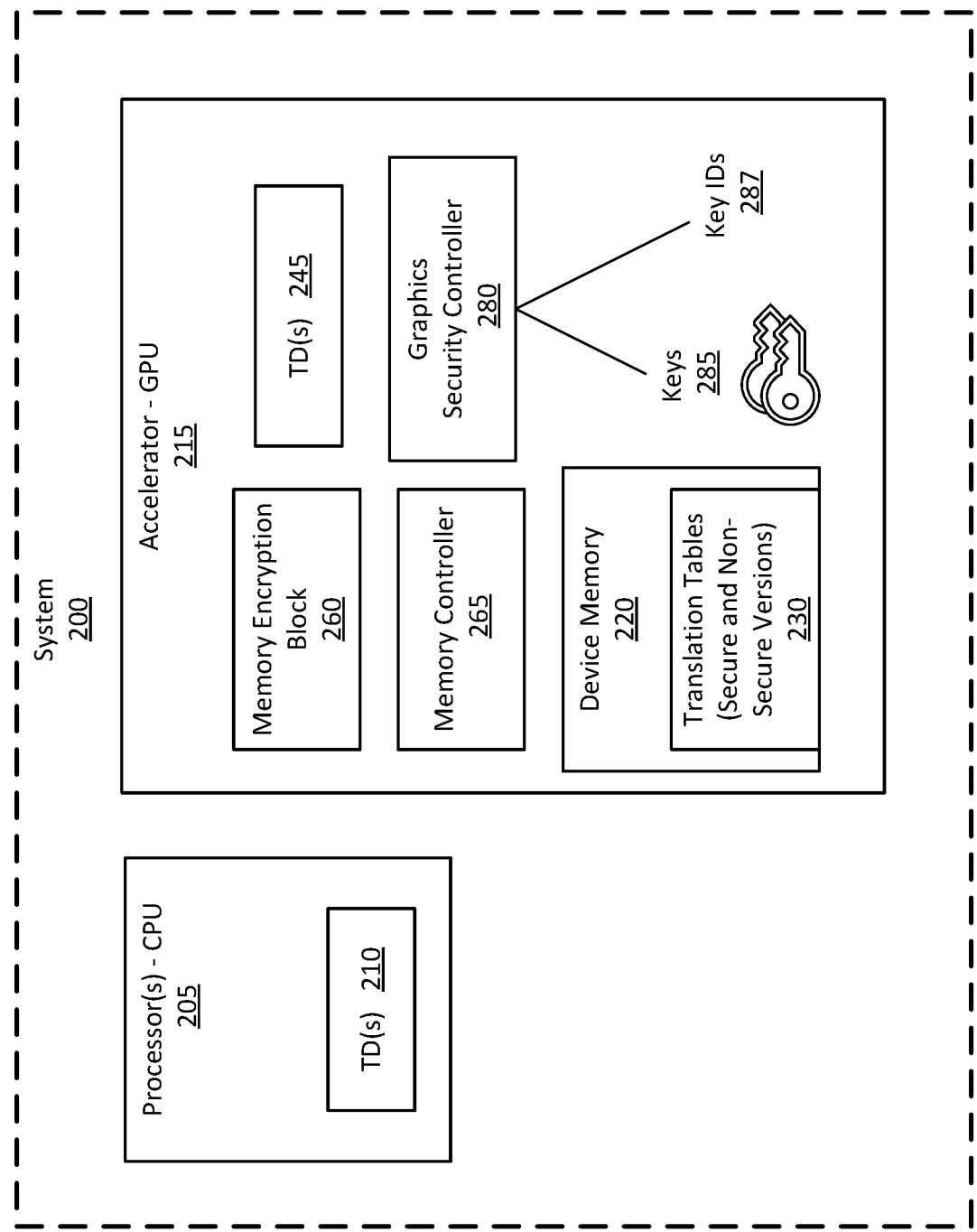
FIGS. 2A and 2B illustrates an example of a system to provide device memory protection for supporting trust domains, according to some embodiments.
Figure 2B:
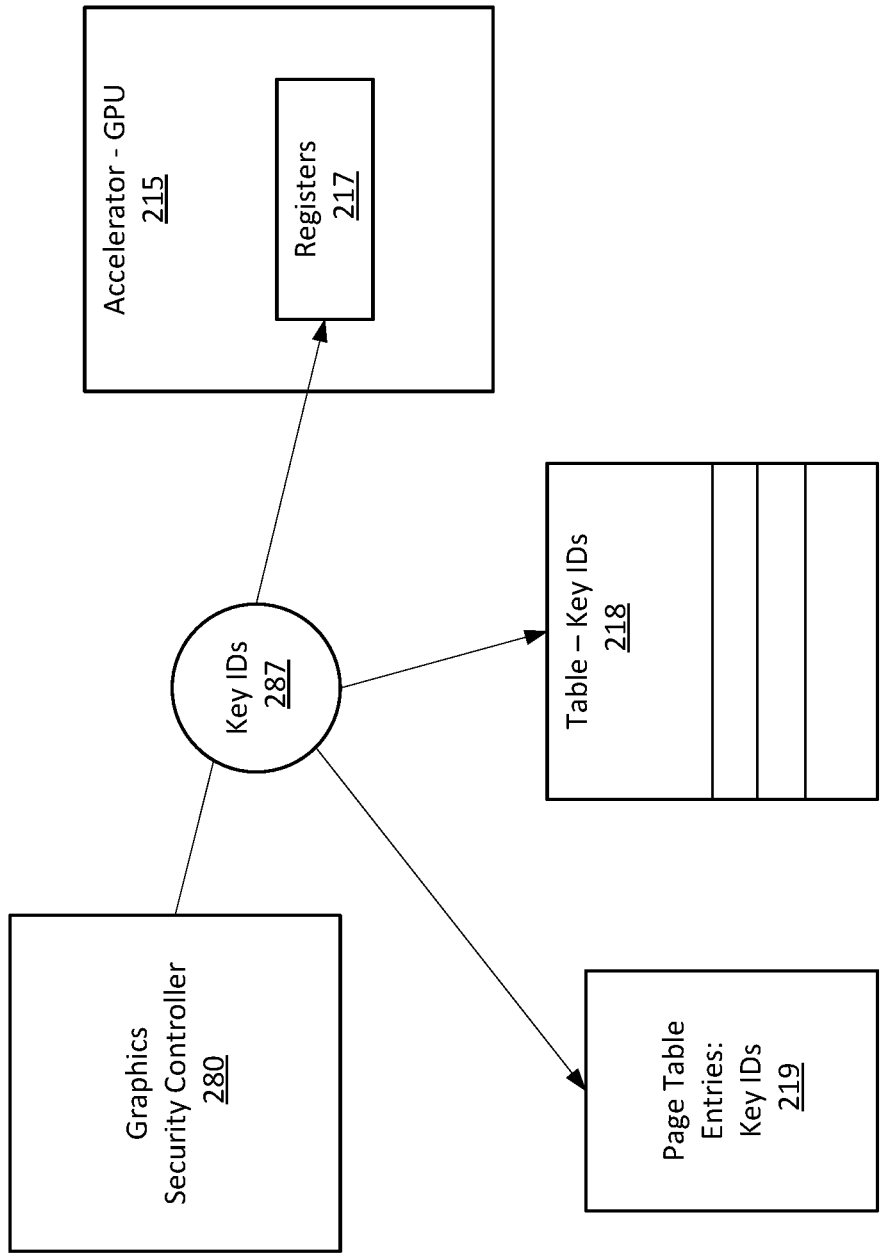

FIGS. 2A and 2B illustrates an example of a system to provide device memory protection for supporting trust domains, according to some embodiments. As illustrated in FIG. 2A, an example of a system 200 includes one or more processors 205, which may include a central processing unit (CPU), and an accelerator that may include a GPU 215. The accelerator 215 includes a device memory 220 and a memory controller 265. Processors 205 may include one or more TDs 210, and the accelerator 215 may include one or more TDs 245.

In some embodiments, the device memory 220 includes translation tables 230 (as further illustrated in FIG. 1A as translation tables 130), wherein the translation tables 230 include a first level table, the first level table being a per process table, and a second level table, the second level table providing final device physical addresses. In some embodiments, the translation tables 230 may include both secure and non-secure versions, wherein the secure version may be generated by the graphics security controller 280. In some embodiments, the GPU hardware is to use the secure version of the second level table for trust domain accesses and the non-secure version for the requests from non-trusted VMs.

In some embodiments, a memory encryption block 260 is provided ahead of the memory controller 265 for memory 220, wherein the memory encryption blocks include support for both confidentiality (in encrypting data for storage) and integrity (in applying one or more integrity protection technologies).

In some embodiments, in order to minimize the added latency in the system 200 that may be caused by the memory confidentiality and integrity protection, the integrity provided by the encryption block 260 is implemented, for example, using a hash function on the CRC bits of the memory controller 265, as further illustrated in FIG. 1B. In some embodiments, the integrity may alternatively or additionally be implemented using storage in a sequestered memory region; or by another integrity protection technology.

In some embodiments, separate keys 285 and key IDs 287 are generated for each trust domain 210 by a security controller 280 to ensure integrity failure occurs when one trust domain attempts to read or write data belonging to another trust domain. For every guest, the security controller 280 will assign keys 285 and key IDs 287.

For example, as illustrated in FIG. 2B, the key IDs 287 can be allocated by the security controller 280 into the GPU 215 and programmed explicitly into registers 217 that are associated with the respective trust domains. Alternatively, the security controller may allocate the key IDs 287 by creating a secure table 218, wherein the page table 218 may include a mapping of key ID to trust domain ID; or may include inserting the key IDs in the page table entry itself 219. Each of such alternatives may be applied to provide necessary support in the GPU 215.

If Key IDs are programmed in registers 217, the registers themselves are provided appropriate protection, wherein only the graphics security controller 280 can update the registers as these are protected from other agents. If a secure device memory page table 218 is used, this may be created by the security controller 280 using a key for a given guest virtual machine. The secure device memory page table 218 is both encrypted and integrity protected in memory using a dedicated key.

In some embodiments, a VMM/hypervisor does not have access to the key assigned to any guest. GPU hardware enforces the appropriate key for reading the guest page tables, and also enforces a guest specific key for any memory accesses when they arise from the appropriate guest. For any requests that target system memory on the host side, the GPU 215 may rely on the host IOMMU (Input-Output Memory Management Unit) and the memory encryption block in host for the appropriate translation and protections. The GPU hardware is to ensure that any system memory operations go out as GPA (Guest Physical Address) after translating virtual address through PPGTT for trust domains, thereby ensuring the host side protections for trust domains naturally occur.

In some embodiments, when a trust domain 245 starts, the trust domain goes through a TD initialization phase. As part of the TD initialization, a unique key is assigned to the trust domain 245 by the graphics security controller 280. The graphics security controller 280 sets up the Key ID mapping (as illustrated in FIG. 2B) for the virtual function in the GPU as well. Depending on the number of trust domains simultaneously supported in the GPU, a secure scheme involving directly updating GPU registers or using integrity protected memory for the table that maps Key ID to trust domain ID can be followed.

Figure 3:
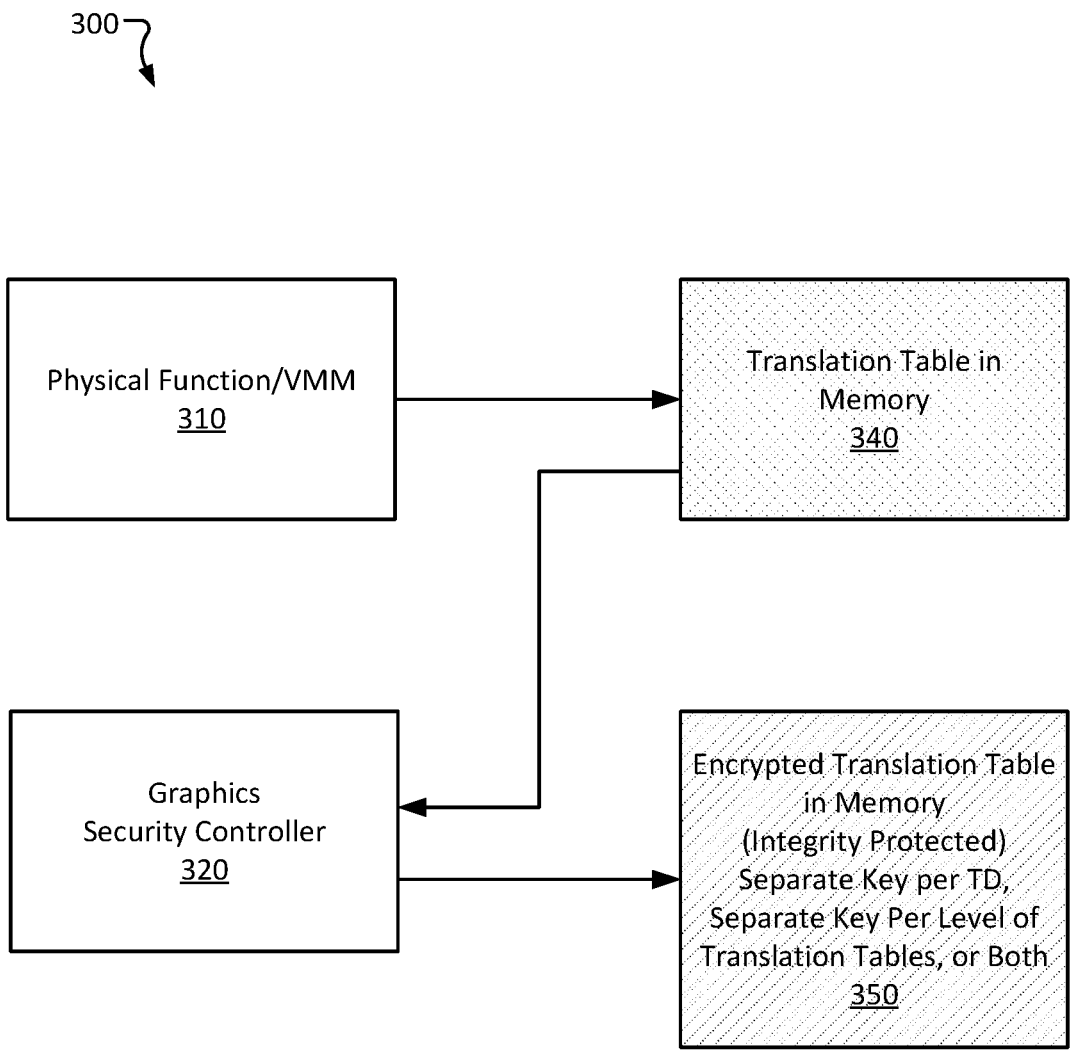
FIG. 3 illustrates security in translation tables, according to some embodiments.

FIG. 3 illustrates security in translation tables, according to some embodiments. As part of moving a trust domain to a secure state, a graphics security controller, such as graphics security controller 280 illustrated in FIGS. 2A and 2B, is used to ensure that pages are not aliased, and, once the pages are assigned, such pages are not re-assigned by the hypervisor/VMM without an explicit indication going back to the trust domain.

In some embodiments, the provision of security in translation tables is accomplished by the graphics security controller creating an integrity protected version of the table in memory (referred to herein as the secure version of the translation table), and the hardware (such as of the GPU) enforcing use of the secure version of the translation table when accesses originate from a trust domain. In some embodiments, if a multi-level page table is used, a unique key is used for each of the levels to ensure that an attack presented by an untrusted host through rearranging the different levels of the table is prevented. In this case, any unexpected access to the translation table would result in an integrity failure when the table is being read by a trust domain as the key IDs are hardware enforced. In some embodiments, the physical function or a non-trusted VF cannot use a trust domain Key ID for accessing or updating the page tables.

For example, as illustrated in FIG. 3, in a system or process 300 a physical function 310 may access a translation table in memory 340. In some embodiments, the translation table in memory 340 is processed by a graphics security controller 320 to provide integrity and security protection of the translation table. The graphics security controller 320 is to generate an encrypted translation table in memory, the encrypted table also include integrity protection. In some embodiments, the encryption includes use of a separate key for each trust domain, a separate key for each level of the page table, or both. In some embodiments, the use of the encrypted table is enforced by device hardware, such as by the GPU hardware handling memory accesses that originate from a trust domain.

Figure 4:
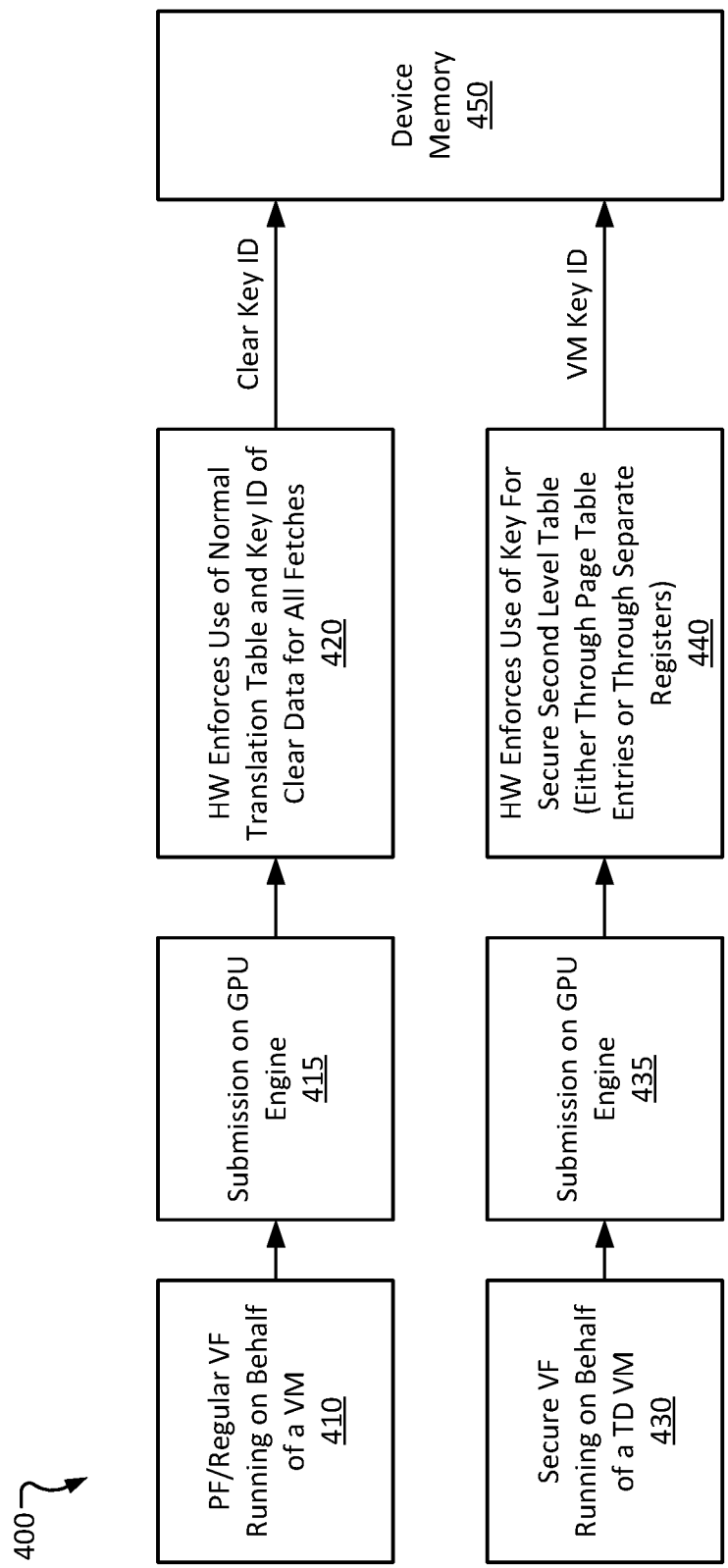
FIG. 4 illustrates translation table access for secure and non-secure sources, according to some embodiments.

FIG. 4 illustrates translation table access for secure and non-secure sources, according to some embodiments. In some embodiments, when GPU hardware is operating on behalf of a trust domain, as part of the normal process flows, GPU hardware will first obtain the trust domain to Key ID mapping that's been set up by the graphics security controller, such as the mapping for key IDs 287 established by graphics security controller 280 as illustrated in FIG. 2B.

In some embodiments, as part of the context set up for a trust domain, the GPU is to fetch a secure version of the translation table, such as the secure version of translation tables 230 illustrated in FIG. 2A, using the appropriate keys. Only the secure version of the translation table is used by the GPU while operating on behalf of a trust domain. Any integrity failure on the secure table itself is detected and reported back to the trust domain. All trust domain memory transactions leaving the GPU will have the Key ID enforced by the GPU. For non-trusted workloads that could be simultaneously running on the GPU, the non-secure version of the translation table is used and all memory transactions leaving the GPU will not use encryption or integrity protection.

In some embodiments, as illustrated in FIG. 4, for a physical function (PF) or regular (i.e., non-secure) virtual function (VF) running on behalf of a non-TD VM 410, in a submission on a GPU engine 415, the GPU hardware enforces use of the non-secure translation table, and specifically use of the normal (non-secure) second level table, and utilizes a key ID for clear data 420 (shown as a Clear Key ID) for all fetches from the device memory 450. In this manner functions for non-secure sources are able to handle memory accesses without requiring decryption of the translation table.

In some embodiments, for a trust domain running on behalf of a TD VM 430, in a submission on the GPU engine 435, the GPU hardware enforces use of the appropriate key for the secure translation table 440, utilizing a VM key ID for all fetches from the device memory 450. In this manner, data for secure TD VM sources is security and integrity protected utilizing the encrypted translation table.

Figure 5A:
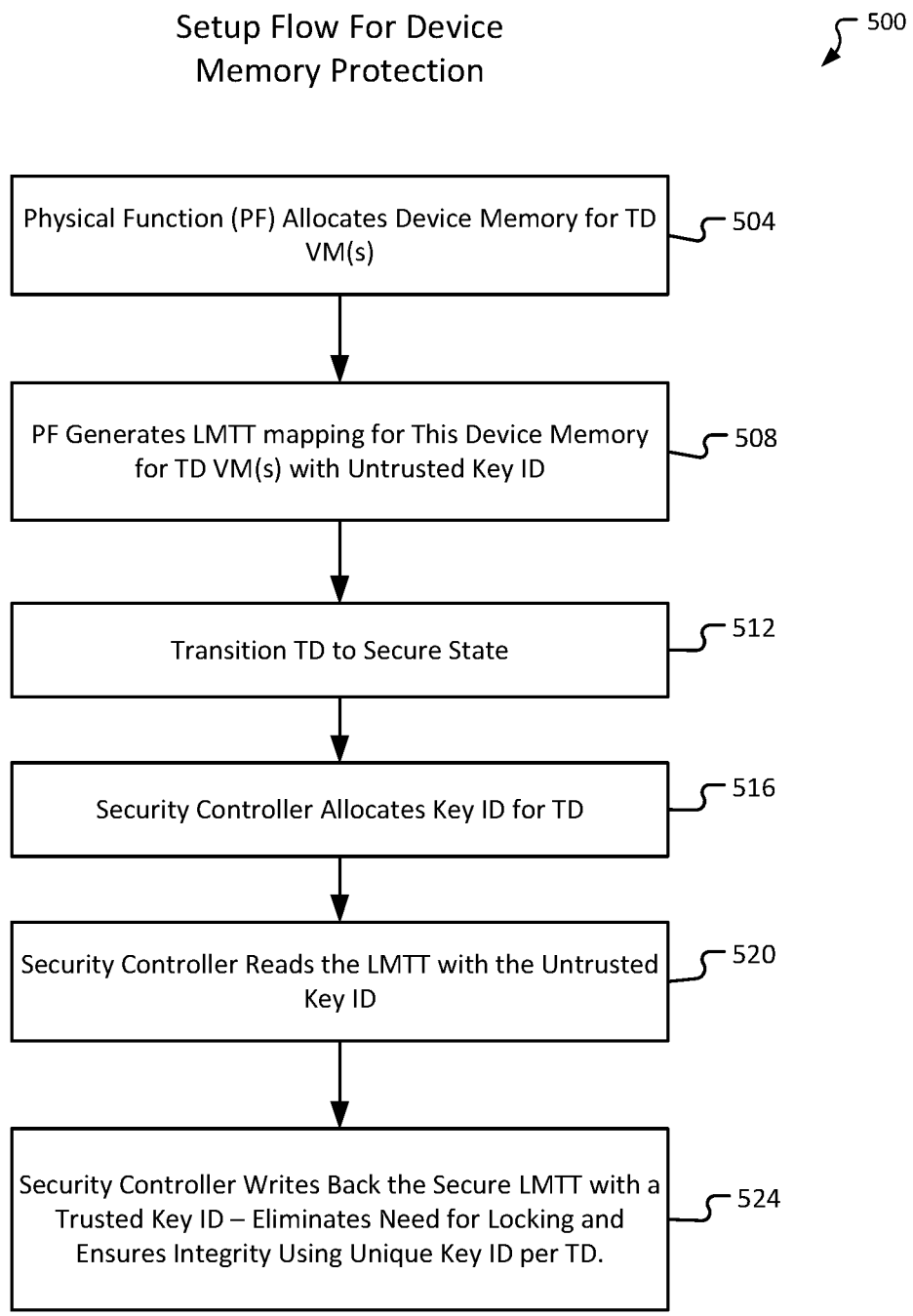
FIG. 5A is a flowchart to illustrate a setup process for device memory protection in support of trust domains, according to some embodiments.

FIG. 5A is a flowchart to illustrate a setup process for device memory protection in support of trust domains, according to some embodiments. In a process 500 illustrated in FIG. 5A, a physical function (PF) allocates device memory for one or more trust domain (TD) virtual machines (VMs) 504, such as the allocation of a portion of memory in memory 125 illustrated in FIG. 1A for a TD VM. The PF may create an LMTT mapping for the device memory for the TD VM using an untrusted key ID 508. In some embodiments, an address translation table includes a table structure with multiple levels, including a first level per process PPGTT table, and a second level LMTT table providing final device physical addresses.

In some embodiments, the process continues with transitioning a particular TD to a secure state 512. A security controller, such as graphics security controller 280 illustrated in FIG. 2A, is then to allocate a key ID for the TD 516. The allocation of key IDs by the security controller may include allocating the key IDs as explicit registers that are mapped to the respective trust domains, allocating the key IDs by creating a secure table, wherein the page table may include a mapping of key ID to trust domain ID; or including the key IDs in the page table entry itself, as illustrated in FIG. 2B.

Figure 5B:
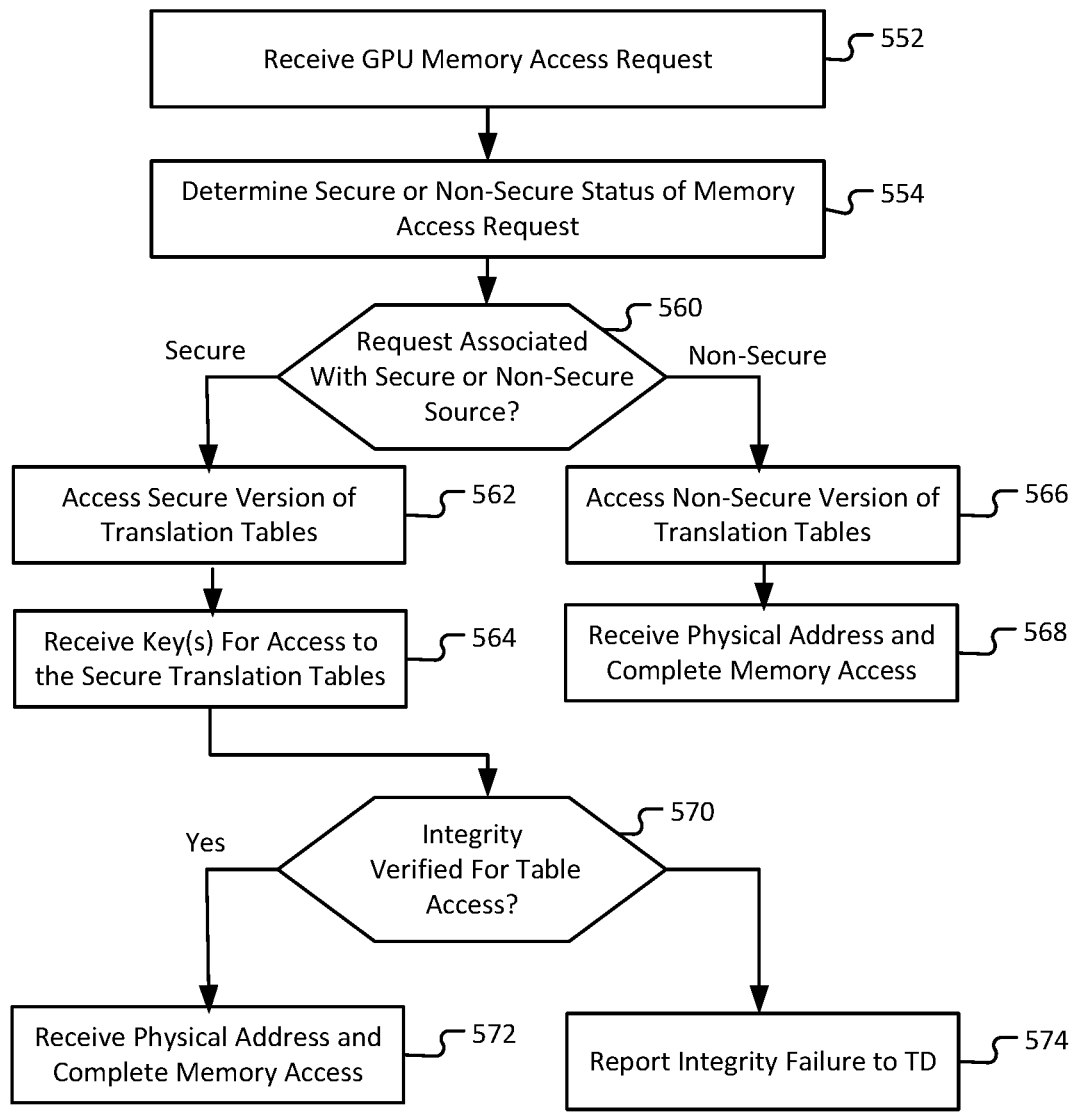
FIG. 5B is a flowchart to illustrate a runtime process for device memory protection in support of trust domains, according to some embodiments.

In some embodiments, the security controller is to read the LMTT table of the address translation tables with an untrusted key ID 520. The security controller is then to write a secure LMTT back to memory with a trusted key ID 524. In this manner, there is no requirement for locking the table in the reading and writing process, and integrity is ensured using a unique key ID per each TD. In some embodiments, GPU hardware may be operable to enforce the secure use of the translation table, the GPU hardware to use the secure version of the translation tables for trust domain accesses and the non-secure version of the translation table for accesses from non-trusted VMs FIG. 5B is a flowchart to illustrate a runtime process for device memory protection in support of trust domains, according to some embodiments. In a process 550 following the setup process 500 illustrated in FIG. 5A, a GPU memory access request is received 552, and a determination is made regarding the secure (associated with a TD) or non-secure status of the memory access request 554. For example, the secure status may be indicated by the status of a TD bit, such as TD bit 175 illustrated in FIG. 1A, or other method of communicating the TD status for the memory access request. If the memory request is a secure memory request 560, the GPU is to access the secure version of the translation tables 562. The process then proceeds with receiving one or more keys for use in accessing the secure translation tables 564. If integrity is then verified for the page table access 570, the process may continue with receipt of the physical address for the request and completing the memory access 572. If integrity is not verified 570, such as in circumstances in which an incorrect key is utilized, an integrity failure may then be reported to the trust domain 574.

If the memory request is a non-secure memory request 560, the GPU is to access the non-secure version of the translation tables 566, and the process may proceed with receiving the physical address for the request and completing the memory access 568.

Figure 6:
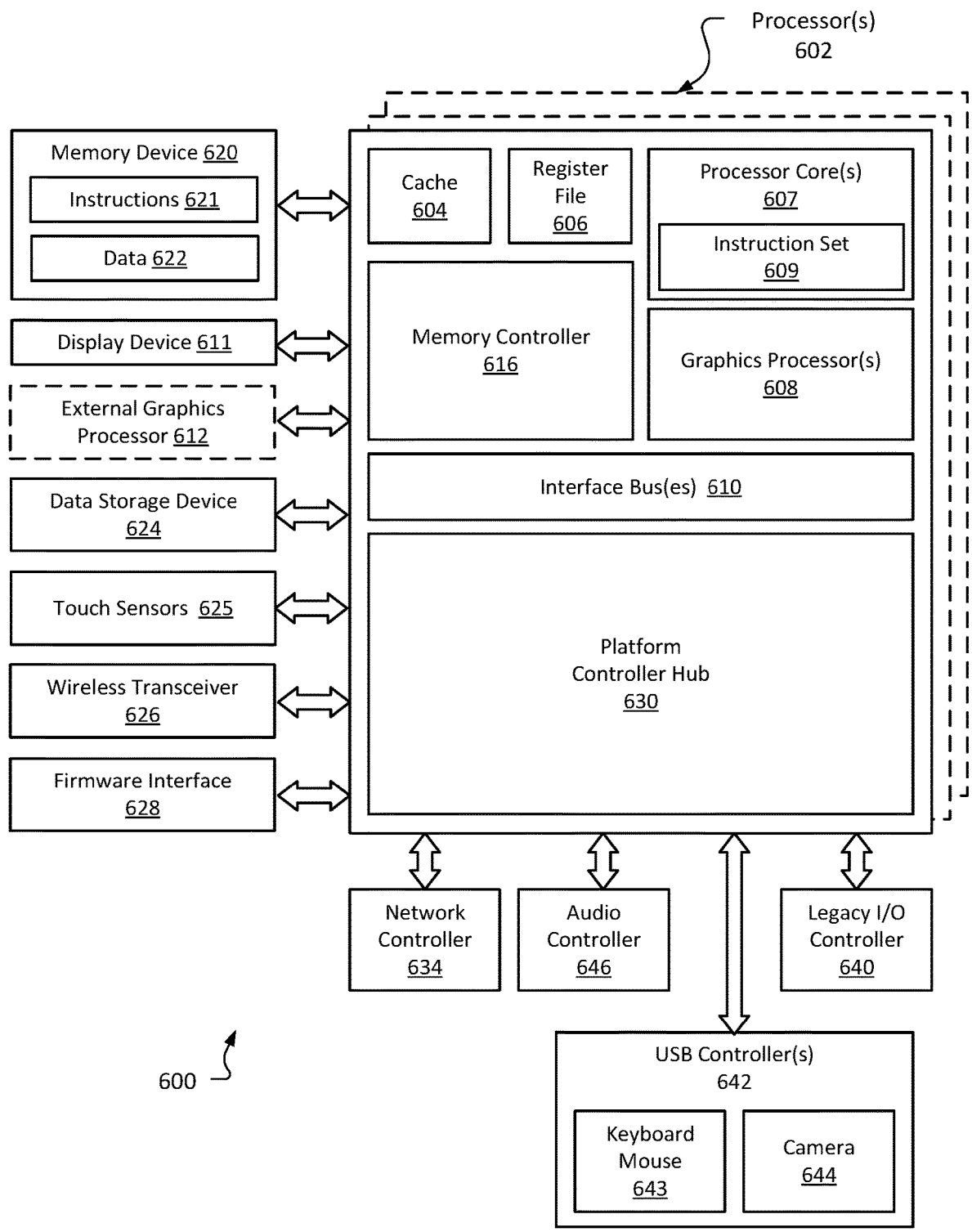
FIG. 6 illustrates an embodiment of an exemplary computing architecture for device memory protection for supporting trust domains, according to some embodiments.

FIG. 6 illustrates an embodiment of an exemplary computing architecture for device memory protection for supporting trust domains, according to some embodiments. In various embodiments as described above, a computing architecture 600 may comprise or be implemented as part of an electronic device. In some embodiments, the computing architecture 600 may be representative, for example, of a computer system that implements one or more components of the operating environments described above. The computing architecture 600 may be utilized to provide device memory protection for supporting trust domains, such as described in FIGS. 1A-5B.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes one or more processors 602 and one or more graphics processors 608, and may be a single processor desktop system, a multiprocessor workstation system, or a server system having a large number of processors 602 or processor cores 607. In one embodiment, the system 600 is a processing platform incorporated within a system-on-a-chip (SoC or SOC) integrated circuit for use in mobile, handheld, or embedded devices.

An embodiment of system 600 can include, or be incorporated within, a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory 604 is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, one or more processor(s) 602 are coupled with one or more interface bus(es) 610 to transmit communication signals such as address, data, or control signals between processor 602 and other components in the system. The interface bus 610, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 602 include an integrated memory controller 616 and a platform controller hub 630. The memory controller 616 facilitates communication between a memory device and other components of the system 600, while the platform controller hub (PCH) 630 provides connections to I/O devices via a local I/O bus.

Memory device 620 can be a dynamic random-access memory (DRAM) device, a static random-access memory (SRAM) device, non-volatile memory device such as flash memory device or phase-change memory device, or some other memory device having suitable performance to serve as process memory. Memory device 620 may further include non-volatile memory elements for storage of firmware. In one embodiment the memory device 620 can operate as system memory for the system 600, to store data 622 and instructions 621 for use when the one or more processors 602 execute an application or process. Memory controller hub 616 also couples with an optional external graphics processor 612, which may communicate with the one or more graphics processors 608 in processors 602 to perform graphics and media operations. In some embodiments a display device 611 can connect to the processor(s) 602. The display device 611 can be one or more of an internal display device, as in a mobile electronic device or a laptop device, or an external display device attached via a display interface (e.g., DisplayPort, etc.). In one embodiment the display device 611 can be a head mounted display (HMD) such as a stereoscopic display device for use in virtual reality (VR) applications or augmented reality (AR) applications.

In some embodiments the platform controller hub 630 enables peripherals to connect to memory device 620 and processor 602 via a high-speed I/O bus. The I/O peripherals include, but are not limited to, an audio controller 646, a network controller 634, a firmware interface 628, a wireless transceiver 626, touch sensors 625, a data storage device 624 (e.g., hard disk drive, flash memory, etc.). The data storage device 624 can connect via a storage interface (e.g., SATA) or via a peripheral bus, such as a Peripheral Component Interconnect bus (e.g., PCI, PCI Express). The touch sensors 625 can include touch screen sensors, pressure sensors, or fingerprint sensors. The wireless transceiver 626 can be a Wi-Fi transceiver, a Bluetooth transceiver, or a mobile network transceiver such as a 3G, 4G, Long Term Evolution (LTE), or 5G transceiver. The firmware interface 628 enables communication with system firmware, and can be, for example, a unified extensible firmware interface (UEFI). The network controller 634 can enable a network connection to a wired network. In some embodiments, a high-performance network controller (not shown) couples with the interface bus 610. The audio controller 646, in one embodiment, is a multi-channel high definition audio controller. In one embodiment the system 600 includes an optional legacy I/O controller 640 for coupling legacy (e.g., Personal System 2 (PS/2)) devices to the system. The platform controller hub 630 can also connect to one or more Universal Serial Bus (USB) controllers 642 connect input devices, such as keyboard and mouse 643 combinations, a camera 644, or other USB input devices.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

The following Examples pertain to certain embodiments:

In Example 1, one or more non-transitory computer-readable storage mediums have stored thereon executable computer program instructions for allocating device memory for one or more trust domains (TDs) in a system including one or more processors and a graphics processing unit (GPU); allocating a trusted key ID for a TD of the one or more TDs; creating LMTT (Local Memory Translation Table) mapping for address translation tables, the address translation tables being stored in a device memory of the GPU; transitioning the TD to a secure state; and receiving and processing a memory access request associated with the TD, processing the memory access request including accessing a secure version of the address translation tables.

In Example 2, transitioning the TD to the secure state includes reading the LMTT from the device memory and writing the LMTT back to the device memory in a secure version of the address translation tables using the trusted key ID.

In Example 3, the instructions further include instructions for receiving and processing a memory access request that does not originate from the TD; and, upon determining that a memory access request does not originate from the TD, accessing a non-secure version of the address translation tables for the memory access request.

In Example 4, hardware of the GPU is to enforce usage of secure and non-secure versions of the address translation tables.

In Example 5, the address translation tables are further integrity protected, and wherein the instructions further include instructions for, upon determining that a memory access request originates from the TD, determining whether integrity is verified for the address translation table access.

In Example 6, the instructions further include instructions for, upon determining that integrity is not verified for the address translation table access, reporting an integrity failure to the TD.

In Example 7, allocating key IDs includes one or more of allocating the key IDs into the GPU as registers that are mapped to respective trust domains; creating a secure table including a mapping of key ID to trust domain ID; or inserting the key IDs in in page table entries in the address translation tables.

In Example 8, the address translation tables include at least a first level table that is a PPGTT (Per-Process Graphics Translation Table) table; and a second level table that is the LMTT table used to obtain a final device physical address.

In Example 9, generating encryption keys includes generating a separate key per each trust domain.

In Example 10, generating encryption keys includes generating a separate key per each level of the address translation tables.

In Example 11, an apparatus includes a GPU (Graphics Processing Unit), the GPU including a graphics security controller; a memory for storage of data; and a memory encryption block, wherein the apparatus is to allocate the device memory for one or more trust domains (TDs) in the apparatus; allocate a trusted key ID for a TD of the one or more TDs; generate LMTT (Local Memory Translation Table) mapping for address translation tables, the address translation tables being stored in the device memory of the GPU; transition the TD to a secure state; and receive and process a memory access request associated with the TD, wherein processing the memory access request include accessing a secure version of the address translation tables.

In Example 12, transitioning the TD to the secure state includes reading the LMTT from the device memory and writing the LMTT back to the device memory in a secure version of the address translation tables using the trusted key ID.

In Example 13, the GPU is further to receive and process a memory access request that does not originate from the TD; and, upon determining that a memory access request does not originate from the TD, accessing a non-secure version of the address translation tables for the memory access request.

In Example 14, hardware of the GPU is to enforce usage of secure and non-secure versions of the address translation tables.

In Example 15, the address translation tables are further integrity protected, and wherein the GPU is further to, upon determining that the memory access request originates from the TD, determining whether integrity is verified for the address translation table access.

In Example 16, the GPU further includes a memory controller, wherein integrity protection for the address translation tables includes a hash value stored in a set of CRC (Cyclic Redundancy Check) bits of the memory controller.

In Example 17, allocating the key IDs includes the graphics security controller to perform one or more of allocating the key IDs into the GPU as registers that are mapped to respective trust domains; creating a secure table including a mapping of key ID to trust domain ID; or inserting the key IDs in page table entries in the address translation tables.

In Example 18, wherein the translation tables include at least a first level table that is a PPGTT (Per-Process Graphics Translation Table) table; and a second level table that is the LMTT used to obtain a final device physical address.

In Example 19, generating encryption keys includes generating a separate key per each trust domain and per each level of the address translation tables.

In Example 20, a VMM (Virtual Machine Manager) for VMs of the apparatus does not have access to generated encryption keys.

In Example 21, a method includes allocating device memory for one or more trust domains (TDs) in a system including one or more processors and a graphics processing unit (GPU); allocating a trusted key ID for a TD of the one or more TDs; creating LMTT (Local Memory Translation Table) mapping for address translation tables, the address translation tables being stored in a device memory of the GPU; transitioning the TD to a secure state; and receiving and processing a memory access request associated with the TD, wherein processing the memory access request include accessing a secure version of the address translation tables.

In Example 22, transitioning the TD to the secure state includes reading the LMTT from the device memory and writing the LMTT back to the device memory in a secure version of the address translation tables using the trusted key ID.

In Example 23, the address translation tables are further integrity protected, and the method further including, upon determining that a memory access request originates from the TD, determining whether integrity is verified for the address translation table access.

In Example 24, determining that the memory access request originates from the TD includes detecting an enabled TD bit for the memory access request.

In Example 25, the translation tables include a first level table that is a PPGTT (Per-Process Graphics Translation Table) table; and a second level table that is the LMTT table used to obtain a final device physical address.

In Example 26, an apparatus includes means for allocating device memory for one or more trust domains (TDs) in a system including one or more processors and a graphics processing unit (GPU); means for allocating a trusted key ID for a TD of the one or more TDs; creating LMTT (Local Memory Translation Table) mapping for address translation tables, the address translation tables being stored in a device memory of the GPU; means for transitioning the TD to a secure state; and means for receiving and processing a memory access request associated with the TD, processing the memory access request including accessing a secure version of the address translation tables.

In Example 27, transitioning the TD to the secure state includes reading the LMTT from the device memory and writing the LMTT back to the device memory in a secure version of the address translation tables using the trusted key ID.

In Example 28, the apparatus further includes means for receiving and processing a memory access request that does not originate from the TD; and means for accessing the non-secure version of the address translation tables for the memory access request upon determining that a memory access request does not originate from the TD.

In Example 29, hardware of the GPU is to enforce usage of secure and non-secure versions of the address translation tables.

In Example 30, the address translation tables are further integrity protected, and the apparatus further includes means for determining whether integrity is verified for the address translation table access upon determining that a memory access request originates from the TD.

In Example 31, the apparatus further includes means for reporting an integrity failure to the TD upon determining that integrity is not verified for the address translation table access.

In Example 32, allocating key IDs includes one or more of allocating the key IDs into the GPU as registers that are mapped to respective trust domains; creating a secure table including a mapping of key ID to trust domain ID; or inserting the key IDs in in page table entries in the address translation tables.

In Example 33, the address translation tables include at least a first level table that is a PPGTT (Per-Process Graphics Translation Table) table; and a second level table that is the LMTT table used to obtain a final device physical address.

In Example 34, generating encryption keys includes generating a separate key per each trust domain.

In Example 35, generating encryption keys includes generating a separate key per each level of the address translation tables.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. One or more non-transitory computer-readable storage mediums having stored thereon executable computer program instructions that, when executed by one or more processors, cause the one or more processors to perform operations comprising:
   allocating device memory in a system, allocating the device memory including allocating memory for one or more trust domains (TDs), the system including one or more processors and a graphics processing unit (GPU), the GPU including a graphics security controller;
   allocating by the graphics security controller a trusted key ID for a TD of the one or more TDs;
   generating a non-secure version of address translation tables in the device memory, the address translation tables including an LMTT (Local Memory Translation Table) providing mapping of device physical addresses;
   transitioning the TD to a secure state, including generating by the graphics security controller a secure version of the address translation tables, the secure version being an encrypted version of the address translation tables, and generating one or more encryption keys to provide access to the secure version of the address translation tables; and
   receiving and processing a memory access request, wherein processing the memory access request includes:
      upon determining that the memory access request is associated with the one or more TDs, accessing the secure version of the address translation tables using an encryption key of the one or more encryption keys, and
      upon determining that the memory access request is not associated with the one or more TDs, accessing the non-secure version of the address translation tables;
   wherein hardware of the GPU is to enforce usage of the secure version of the address translation tables for requests that are associated with the one or more TDs and the non-secure version of the address translation tables for requests that are not associated with the one or more TDs.

2. The storage mediums of claim 1, wherein generating the secure version of the address translation tables includes reading the LMTT from the device memory and writing the LMTT back to the device memory in a secure version of the address translation tables using the trusted key ID.

3. The storage mediums of claim 1, wherein the secure version of the address translation tables is further integrity protected, and wherein the instructions further include instructions for:
   upon determining that a memory access request originates from a TD of the one or more TDs, determining whether integrity is verified for access to the secure version of the address translation tables.

4. The storage mediums of claim 3, wherein the instructions further include instructions for:
   upon determining that integrity is not verified for the access to the secure version of the address translation table access, reporting an integrity failure to the TD.

5. The storage mediums of claim 1, wherein allocating trusted key IDs for the GPU includes one or more of:
   allocating the trusted key IDs into the GPU as registers that are mapped to respective TDs;
   creating a secure table including a mapping of trusted key ID to trust domain ID; or
   inserting the trusted key IDs in page table entries in the secure version of the address translation tables.

6. The storage mediums of claim 1, wherein the address translation tables include at least:
   a first level table that is a PPGTT (Per-Process Graphics Translation Table); and
   a second level table that is the LMTT used to obtain a final device physical address.

7. The storage mediums of claim 6, wherein generating encryption keys includes generating a separate encryption key for each TD of the one or more TDs.

8. The storage mediums of claim 7, wherein generating encryption keys includes generating a separate encryption key for each level of the address translation tables.

9. An apparatus comprising:
   a GPU (Graphics Processing Unit), the GPU including:
      a graphics security controller;
      a device memory for storage of data; and
      a memory encryption block;
   wherein the GPU is to:
   allocate at least a portion of the device memory for one or more trust domains (TDs) in the apparatus;
   allocate by the graphics security controller a trusted key ID for a TD of the one or more TDs;
   generate a non-secure version of address translation tables in the device memory, the address translation tables including an LMTT (Local Memory Translation Table) providing mapping of device physical addresses;
   transition the TD to a secure state, including generating by the graphics security controller a secure version of the address translation tables, the secure version being an encrypted version of the address translation tables, and generating one or more encryption keys to provide access to the secure version of the address translation tables; and
   receive and process a memory access request, wherein processing the memory access request include includes:
      upon determining that the memory access request is associated with the one or more TDs, accessing the secure version of the address translation tables using an encryption key of the one or more encryption keys, and upon determining that the memory access request is not associated with the one or more TDs, accessing the non-secure version of the address translation tables;

wherein hardware of the GPU is to enforce usage of the secure version of the address translation tables for requests that are associated with the one or more TDs and the non-secure version of the address translation tables for requests that are not associated with the one or more TDs.

10. The apparatus of claim 9, wherein generating the secure version of the address translation tables includes reading the LMTT from the device memory and writing the LMTT back to the device memory in a secure version of the address translation tables using the trusted key ID.

11. The apparatus of claim 9, wherein the secure version of the address translation tables is further integrity protected, and wherein the GPU is further to:

upon determining that the memory access request originates from a TD the one or more TDs, determining whether integrity is verified for access to the secure version of the address translation tables.

12. The apparatus of claim 11, wherein the GPU further includes a memory controller, and wherein integrity protection for the address translation tables includes a hash value stored in a set of CRC (Cyclic Redundancy Check) bits of the memory controller.

13. The apparatus of claim 9, wherein allocating trusted key IDs for the GPU includes the graphics security controller to perform one or more of:

allocating the trusted key IDs into the GPU as registers that are mapped to respective TDs;

creating a secure table including a mapping of trusted key ID to trust domain ID; or inserting the trusted key IDs in page table entries in the secure version of the address translation tables.

14. The apparatus of claim 9, wherein the translation tables include at least:

a first level table that is a PPGTT (Per-Process Graphics Translation Table); table; and a second level table that is the LMTT used to obtain a final device physical address.

15. The apparatus of claim 14, wherein generating encryption keys includes generating a separate encryption key for each trust domain and for each level of the address translation tables.

16. The apparatus of claim 9, wherein a VMM (Virtual Machine Manager) for virtual machines (VMs) of the apparatus does not have access to generated encryption keys.

17. A method comprising:

allocating device memory in a system, allocating the device memory including memory for one or more trust domains (TDs), the system including one or more processors and a graphics processing unit (GPU), the GPU including a graphics security controller;

allocating by the graphics security controller a trusted key ID for a TD of the one or more TDs;

generating a non-secure version of address translation tables in the device memory, the address translation tables including an LMTT (Local Memory Translation Table) providing mapping of device physical addresses;

transitioning the TD to a secure state, including generating by the graphics security controller a secure version of the address translation tables, the secure version being an encrypted version of the address translation tables, and generating one or more encryption keys to provide access to the secure version of the address translation tables; and receiving and processing a memory access request, wherein processing the memory access request include includes:

upon determining that the memory access request is associated with the one or more TDs, accessing the secure version of the address translation tables using an encryption key of the one or more encryption keys, and upon determining that the memory access request is not associated with the one or more TDs, accessing the non-secure version of the address translation tables;

wherein hardware of the GPU is to enforce usage of the secure version of the address translation tables for requests that are associated with the one or more TDs and the non-secure version of the address translation tables for requests that are not associated with the one or more TDs.

18. The method of claim 17, wherein generating the secure version of the address translation tables includes reading the LMTT from the device memory and writing the LMTT back to the device memory in a secure version of the address translation tables using the trusted key ID.

19. The method of claim 17, wherein determining that the memory access request originates from the one or more TDs includes detecting an enabled TD bit for the memory access request.

20. The method of claim 17, wherein the address translation tables include:

a first level table that is a PPGTT (Per-Process Graphics Translation Table); and a second level table that is the LMTT used to obtain a final device physical address.

21. The storage mediums of claim 1, wherein the one or more TDs include a plurality of TDs, and wherein the instructions further include instructions for:

allocating by the graphics security controller a different trusted key ID for each TD of the plurality of TDs.

* * * * *